United States Patent [19]

Paradis

[11] 4,304,743

[45] * Dec. 8, 1981

[54] METHODS OF MANUFACTURING ASSEMBLAGES OF FASTENERS

[75] Inventor: Joseph R. Paradis, Holden, Mass.

[73] Assignee: Dennison Manufacturing Company, Framingham, Mass.

[ * ] Notice: The portion of the term of this patent subsequent to Jan. 15, 1997, has been disclaimed.

[21] Appl. No.: 109,578

[22] Filed: Jan. 4, 1980

Related U.S. Application Data

[63] Continuation-in-part of Ser. No. 816,842, Jul. 18, 1977, Pat. No. 4,183,894.

[30] Foreign Application Priority Data

Aug. 12, 1976 [MX] Mexico .................................. 165871

[51] Int. Cl.³ .............................................. B29C 17/02
[52] U.S. Cl. ...................................... 264/25; 264/291; 264/296; 264/297
[58] Field of Search ................ 264/291, 2 S, 296, 297; 24/150 FP

[56] References Cited

U.S. PATENT DOCUMENTS

| | | | |
|---|---|---|---|
| 2,515,175 | 7/1950 | Arbogast | 264/291 |
| 3,380,122 | 4/1968 | Kirk | 264/291 |
| 3,508,553 | 4/1970 | Kanbar | 264/291 |
| 3,781,402 | 12/1973 | Hanggi et al. | 264/291 |
| 3,983,657 | 10/1976 | Klein | 264/291 |
| 4,183,894 | 1/1980 | Paradis | 264/291 |
| 4,198,370 | 4/1980 | Suzuki | 264/291 |

Primary Examiner—James B. Lowe
Attorney, Agent, or Firm—George E. Kersey

[57] ABSTRACT

Assemblages of fasteners are manufactured by the molding of assemblages of connected individual fasteners and simultaneously stretching the fasteners while subjecting them to controlled heating. The end members of the fasteners are protected from adverse heating effects.

13 Claims, 11 Drawing Figures

FIG. IA
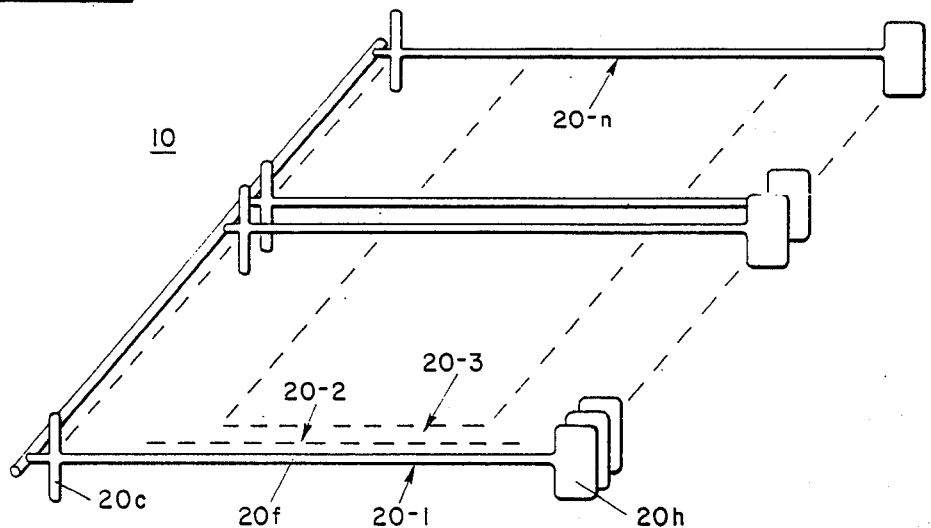
FIG. IB
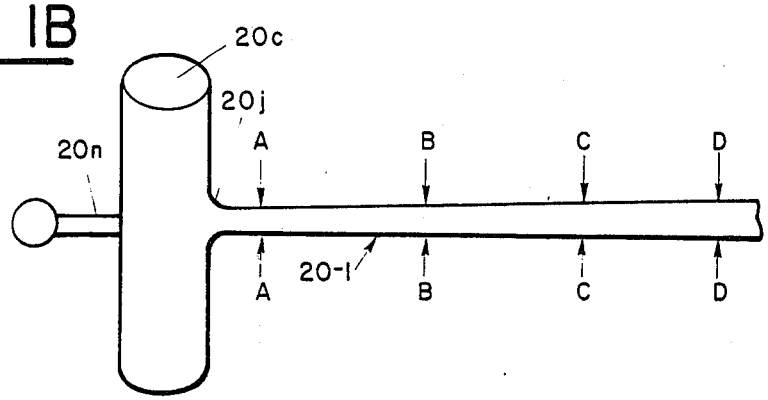

METHODS OF MANUFACTURING ASSEMBLAGES OF FASTENERS

This is a continuation-in-part of Ser. No. 816,842, filed July 18, 1977, now U.S. Pat. No. 4,183,894 issued Jan. 15, 1980.

The invention relates to the manufacture of assemblages of fasteners and more particularly but not exclusively assemblages of fasteners which are dispensable by machine for the tagging and attachment of articles.

BACKGROUND OF THE INVENTION

Many different types of fasteners have been used for the tagging and attachment of articles. One construction is described in United States Ser. No. 153,154, now abandoned. These fasteners were produced by molding an assemblage of individual fasteners, each with a thin filament interconnecting a cross bar with a head, and joined together by necks to a common runner bar. These fasteners can be dispensed using a gun as described in U.S. Pat. No. 3,103,666.

After the development of the fastener described in U.S. No. 153,154, it was discovered that these fasteners could be significantly and unexpectedly improved by being stretched as described in U.S. Pat. No. 3,444,597, which also describes the stretching of the individual fasteners of an assemblage simultaneously. Various methods for producing stretched fasteners are described in U.S. Pat. Nos. 3,380,122, 3,444,597, and 3,457,589. As described in those specifications, the assemblages of fasteners are molded with slight tapers in a portion of their filaments in order to ensure that the stretching will extend substantially to the junctions of the filaments with the cross bars. While the manufacturing methods described in these specifications provide suitable fasteners, they require an appreciable time interval, e.g. cycle time, between molding and the completion of stretching. In addition, while these methods are eminently suitable for easily stretchable crystalline materials, such as nylon, they are less suitable for relatively rigid crystalline materials such as polypropylene.

Another difficulty encountered with materials such as polypropylene is that the cross bars tend to be pulled forward at their junctions with filaments. This distortion of the cross bar can make the fasteners inoperative and produce jamming in dispensing devices.

SUMMARY OF THE INVENTION

According to the present invention, a method of manufacturing an assemblage of fasteners comprises:

(a) molding the assemblage as a set of connected individual fasteners, each individual attachment including an end member which is joined by a filament, and (b) stretching the individual fasteners simultaneously while subjecting them to controlled heating at a prescribed position along the lengths of their filaments, and protecting each end member from adverse heating effects, with said controlled heating being directed to the filaments simultaneously.

Undesired heating effects at the cross bars of the individual fasteners are prevented by selective shielding or masking. It is also desirable to cool at least one of the stretching elements and to have the jaw opening for the associated element of a lesser magnitude than the minimum diameter of the filaments being stretched.

Details of certain preferred features are as follows:

The assemblage may be fed into a stretching machine with jaws that grip the fasteners at opposite ends. The jaws are then separated to take up slack in the filaments which are simultaneously subjected to a controlled heating effect with the associated cross bars being shielded or masked. The jaws are then separated for stretching, followed by relaxation to permit removal of the stretched assemblage from the stretching machine.

The mask or shield is advantageously a part of a stretching jaw, but it may be a separate member.

The fasteners can be produced in a mold with separable parts, with the filaments being subjected to controlled heating as the mold parts are separated.

The controlled heating is desirably achieved using an infrared radiator, which has its heating effect directed to the junctions of the filaments with their end members.

Each of the filaments desirably has a taper over a portion of its length in order to ensure that the stretching extends to the junctions with the cross bars. However, the filaments may be of other configuration, including a generally cylindrical configuration.

The fasteners are preferably of a crystalline material whose molecules are reoriented by stretching and are desirably selected from nylon, polyethylene, polypropylene and polyester and acetal resins.

DESCRIPTION OF THE DRAWINGS

The invention may be carried into practice in various ways but a number of examples will now be described with reference to the accompanying drawings, in which:

FIG. 1A is a perspective view of an assemblage of fasteners;

FIG. 1B if an enlargement of a portion of an individual fastener from the assemblage of FIG. 1A;

DETAILED DESCRIPTION

Figure 2A:
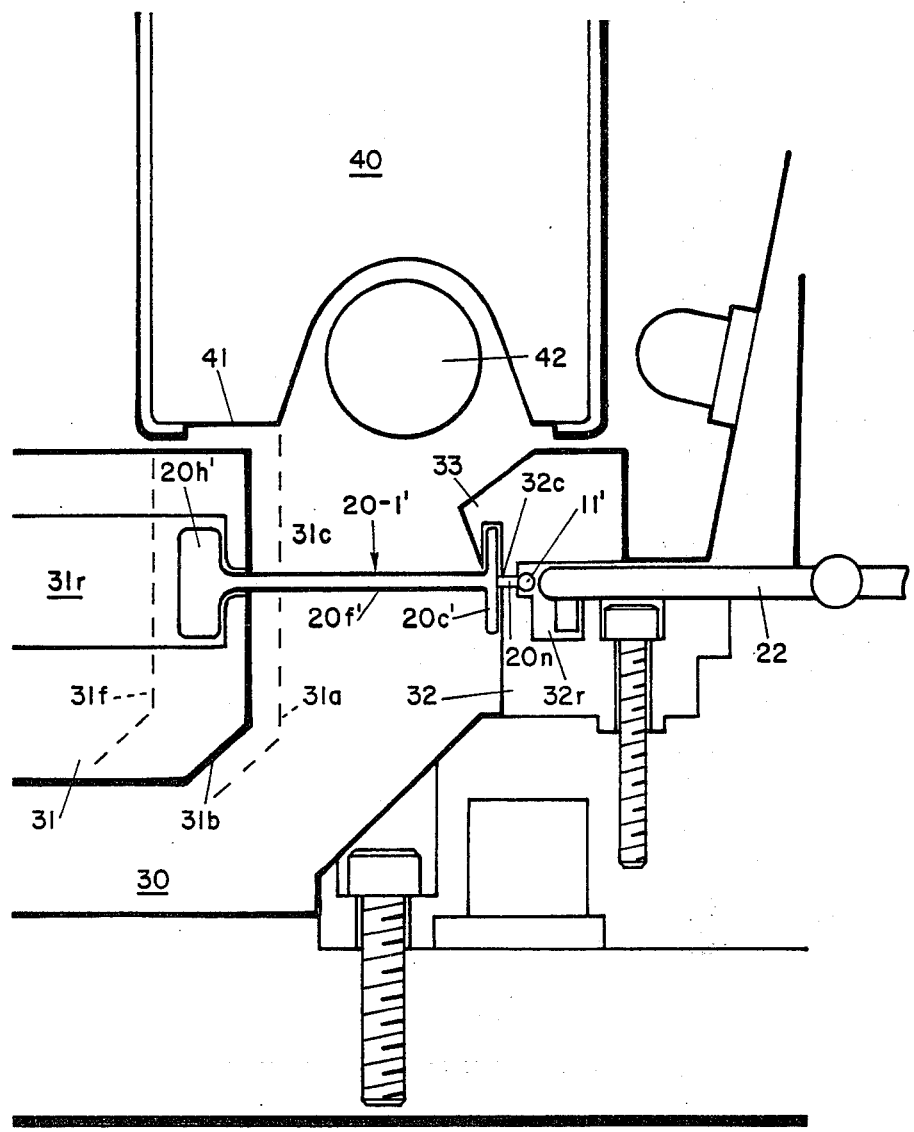
FIG. 2A is a plan view of stretching apparatus used to manufacture the assemblage shown in FIGS. 1A and 1B.

Turning now to the drawings, FIG. 1A shows an assemblage 10 of individual fasteners 20-1 to 20-n of which each individual fastener, for example the first fastener 20-1, includes a cross bar 20c which is joined to a head 20h by a filament 20f. The fasteners 20-1 to 20-n are collectively joined to a runner bar 11 by individual necks 20n which extend from the cross bars 20c.

Although the filaments 20f of the fasteners 20-1 to 20-n appear to be cylindrical over the major portion of their length beginning at the cross bars 20c, they typically display a region of slight taper. This is illustrated in the enlarged fragment of an individual fastener 20-1 shown in FIG. 1B. In the illustrative fastener 20-1 of FIG. 1B there is a minimum diameter of approximately 5.59 mm at position A, located approximately 16.76 mm from the junction 20j of the fastener 20-1 with the cross bar 20c. The diameter of the filament 20f gradually increases to 6.10 mm at position B, then to 6.35 mm at position C and further to 6.60 mm at position D.

The fastener assembly shown in FIGS. 1A and 1B is stretched in a machine 30 of the construction shown in FIG. 2A. The machine 30 includes an outer jaw 31, an inner jaw 32, and a heat mask or shield 33. The outer jaw has an interior region 31r for receiving one end of the product to be stretched and the inner jaw 32 has a similar interior region 32r for the other end of the product.

Figure 2B:
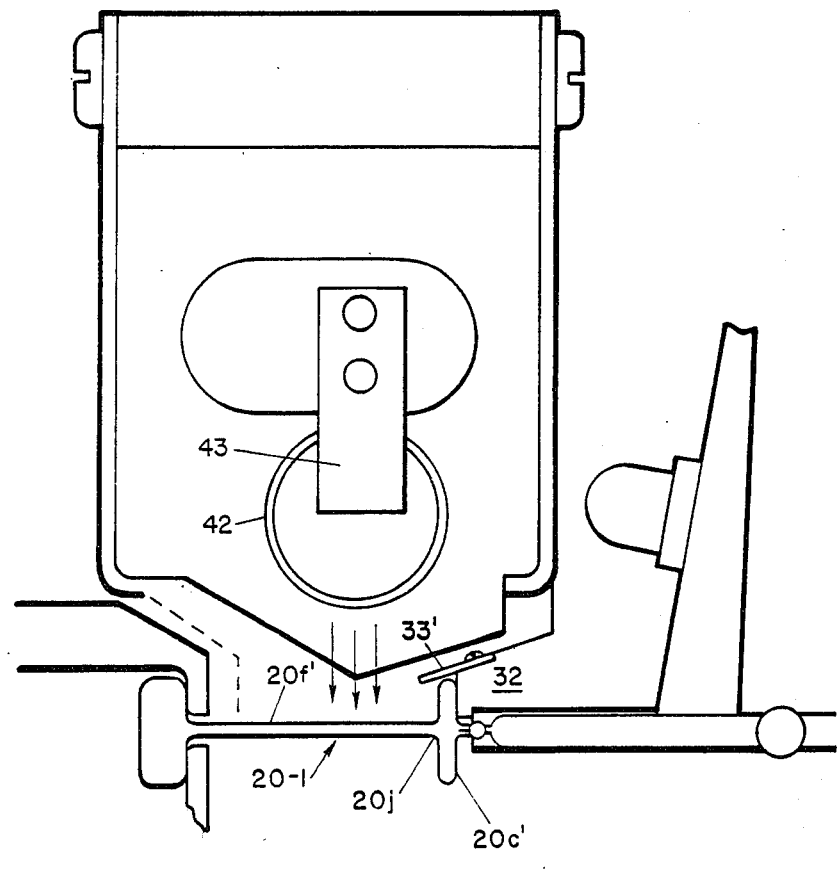
FIG. 2B is a plan view of an alternative stretching apparatus.

In the case of an assemblage of unstretched fasteners, of which only the first member 20-1 is visible in FIG. 2B, the head of the fastener 20h is within the interior region 31r of the outer jaw 30 and the runner bar 11 is within the interior region 32r of the inner jaw 32.

The outer jaw 31 has a channel 31c to accommodate the portion of the filament 20f near the head 20h'. A similar channel 31c is included in the inner jaw 32.

In the particular embodiment of FIG. 2A, the inner jaw 32 is stationary and the outer jaw 31 is separable away from the inner jaw by, for example, a hydraulic mechanism.

Only one-half of the machine 30 is illustrated in FIG. 2A and a similar half is used for the concurrent stretching of another set of blanks which is joined to the set within the jaws 31 and 32 by a connector 22 constituted by a gating sprue.

After the assemblages of fasteners, as joined by the degatable connector or sprue 22, are fed to the machine 30 with, for example, the illustrated fastener 20-1' positioned between the jaws 31 and 32, the outer jaws, for example the jaw 31, are operated to take up slack in the fastener and move from an initial position 31a to an intermediate position 31b.

In the general case stretching could proceed by moving the outer jaw 31 to the position 31f. To accelerate the stretching and to facilitate the stretching of stretch resistant crystallised plastics materials such as polypropylene, a controlled heat source 40 is used.

In the case of FIG. 2A, an alternative heat mask or shield 33' is employed by attaching an extension to the inner jaw 32.

The controlled heat source 40 includes a holder 41 and a quartz infra-red lamp 42 which is described in detail below. The heat from the lamp 42 is initially applied when the outer jaw in in its position 31a. The heat effect continues to be applied as the jaw 31 moves to its final position 31f which results in the production of the fastener shown in FIG. 1A. After stretching is completed, the jaw 31 is relaxed to permit removal of the stretched fasteners from the machine 30. The heat shield 33, which may be affixed to the jaw 32, protects the cross bar 20'c from adverse heating effects, and, in particular, limits the extent to which the cross bar may become adversely affected during the stretching operation.

The channel 32c of the inner jaw 32 shields the neck 20'n of the fasteners so that the gripping action of the jaw 32 is against the runner bar 11'. The shielding of the neck 20'n prevents it from being inadvertently stretched, while the gripping of the runner bar 11' prevents inadvertent damage to the cross bar 20'c.

In the modified apparatus shown in FIG. 2B, which is otherwise the same as that shown in FIG. 1, the lamp 42 is positioned in an adjustable end mount 43 in order to direct the heating to the desired portion of the filament 20f.

The end mount 43 is adjustable in any standard way to control the direction of the infra-red radiation from the lamp 42.

Figure 3:
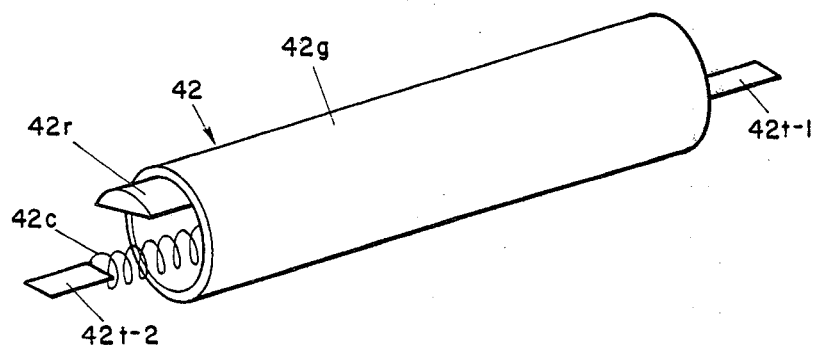
FIG. 3 is a perspective view of a heating member used in the machines shown in FIGS. 2A and 2B.

A perspective view of a portion of the lamp 42 shown in FIG. 2A (or of the lamp 42 shown in FIG. 2B) is shown in FIG. 3. A quartz tube 42q encloses a resistor coil 42c which has terminal tabs 42t-1 and 42t-2. Above the coil 42c there is an internal reflector 42r which orthogonally directs the infra-red radiation. The lamp 42 may be that known as a Unit Tube Infra-Red Heater available from Hugo N. Cahnman, Associates, Inc., 125-10 Queens Boulevard, Kew Gardens, N.Y. 11415, United States of America. It has an infra-red emission range of 2 to 5 microns and provides a temperature between 315 and 1100 C.

The temperature H of the heat source 42 and the time T during which the fasteners are exposed to the heating effect is desirably optimised so that the product of the heating effect and the temperature is below the value which would cause melting of the fasteners.

The internal reflector 42r of the heat source 42 can cause about 85% of the radiated energy to be directed at the product.

Figure 4A:
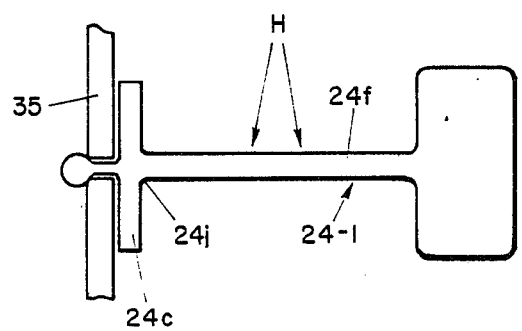
FIGS. 4A and 4B are views illustrating an alternative method of manufacture.
Figure 4B:
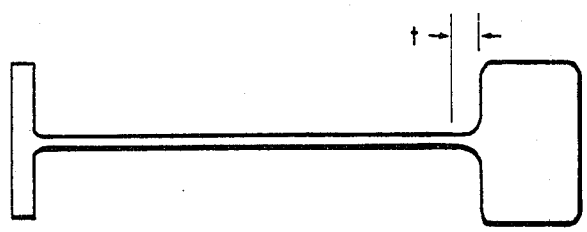

An alternative form of fastener is shown in the jaw 35 in FIG. 4A. For the individual fastener 24-1 of FIG. 4A the filament 24f is substantially cylindrical throughout the major portion of its length. Because of the heat effect H, stretching takes place as illustrated in FIG. 4B. Since the filament is of cylindrical cross section its stretched counterpart is also substantially cylindrical. However, there is a slight region of taper t near the head 24h. The cylindrical filament 24f, although more difficult to control, does not require as great a mold expense and avoids the possibility of having a region of excessive thickness which could lead to inadvertent fracture during stretching.

Figure 5:
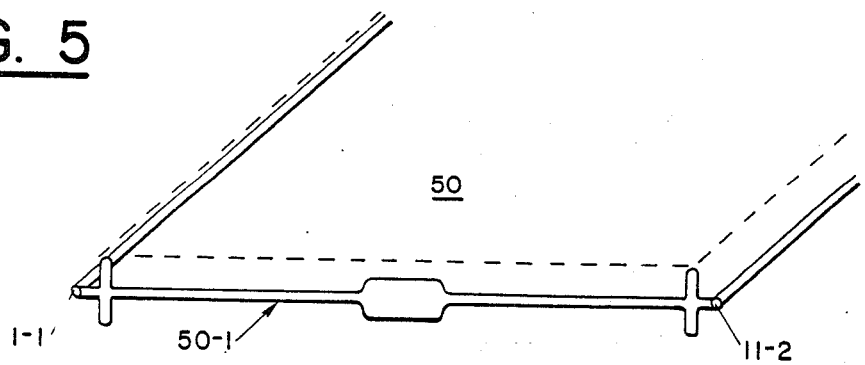
FIG. 5 is a perspective view of a further assemblage of fasteners.

FIG. 5 shows an assemblage 50 of fasteners each of which is stretched and has two cylindrical filaments 50-1 and cross bars 50c-1 and 50c-2 at opposite ends and rubber bars 11-1 and 11-2 associated with the respective cross bars. Either of the runner bars 11-1 or 11-2 can be used for feeding purposes in a gun as described in, for example, U.S. Pat. No. 3,103,666 mentioned above. The other runner bar 11-2 or 11-1 give stiffness to the assemblage 50 and facilitates their being handled during stretching operations where controlled heating is employed. One of the runner bars can be removed by degating at the completion of the stretching operation. It will be apparent that an auxiliary runner bar to facilitate handling in stretcher operations which employ controlled heating can be used for other kinds of fasteners and devices.

Figure 6A:
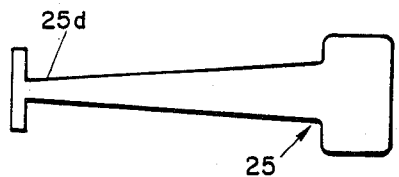
FIG. 6A to 6C are perspective views of alternative assemblages prior to stretching.
Figure 6B:
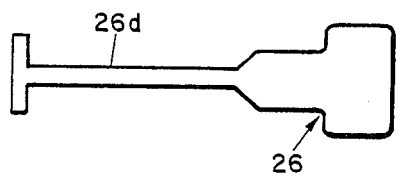
Figure 6C:
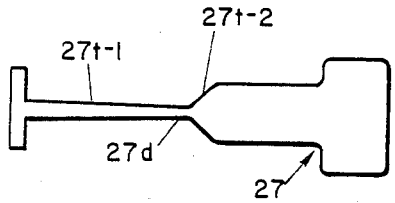

Other kinds of blanks which can be subjected to stretching in the manner described are shown in FIGS. 6A to 6C. In FIG. 6A the unstretched fastener 25 has its minimum diameter 25d a short distance from the cross bar 25c. In FIG. 6B the fastener 26 has a substantially cylindrical filament 26f with a minimum diameter in an intermediate position 26d. In FIG. 6C the minimum diameter 27d is at the junction of a decreasing taper 27t-1 (beginning at the cross bar 27c) and a forward taper 27t-2.

When uniform heating is applied to the filaments 25f, 26f, and 27f in FIGS. 6A and 6C stretching begins at the minimum diameter positions 25d, 26d and 27d and progresses in the direction of the succeeding minima. Thus in the case of FIG. 6C, since the second taper 27t-2 has a higher shoulder than the first taper 27t-1, stretching takes place to the junction 27*j* before there is any significant stretching in the region of the forward taper 27*t*-2.

What is claimed is:

1. The method of manufacturing an assemblage of fasteners which comprises the steps of
   (a) molding the assemblage as a set of connected individual fasteners, each individual attachment including an end member which is joined by a filament, and
   (b) stretching the individual fasteners simultaneously while subjecting them to controlled heating at a prescribed position along the lengths of their filaments and protecting the end members from adverse heating effects, with said controlled heating being directed to the filaments simultaneously.

2. The method of manufacturing an assemblage of fasteners which comprises the steps of
   (a) molding the assemblage as a set of connected individual fasteners, each including an end member which is joined by a filament, and
   (b) stretching the individual fasteners simultaneously while subjecting them to controlled heating at the junctions of their filaments with their end members and protecting said end members from adverse heating effects, with said controlled heating being directed to the filaments simultaneously.

3. The method of claim 2 wherein said assemblage is formed in a mold with separable parts and the parts are separated to stretch the fasteners while subjecting them to said controlled heat.

4. A method as claimed in claim 2 in which each filament includes a taper over a portion of its length.

5. A method as claimed in claim 2 or claim 4 in which the fasteners are connected at one end by a common member and the stretching takes place using jaws which grasp the common member and the other end of the fasteners.

6. A method as claimed in claim 2 or claim 4 in which the fasteners are joined at opposite ends by common members and the stretching is accomplished by jaws which grasp the said common members.

7. A method as claimed in claim 2 or claim 4 in which the controlled heating is provided by infra-red radiation.

8. The method of claim 2 wherein the assemblage is fed into a stretching machine with jaws which grip the fasteners at opposite ends and the jaws are separated to take up slack in the fasteners while causing their filaments to become controllably heated, after which the jaws are separated to stretch the filaments simultaneously and are then relaxed to free the assemblage of stretched fasteners and permit their removal.

9. A method as claimed in claim 2 or 8 in which the material of the fasteners is a crystalline substance whose molecules are reoriented by stretching.

10. A method as claimed in claim 9 in which the material is selected from nylon, polyethylene, polypropylene and polyester and acetal resins.

11. The method of claim 2 or 8 wherein said fasteners are molded from polypropylene material which is resistant to cold stretching.

12. The method of claim 8 wherein the jaws which grip one end of the fasteners are cooled by a liquid coolant.

13. The method of claim 2 wherein the heat H in BTUs per hour and the time of exposure T in hours of the product HT is below the threshold of melting for the fasteners.

* * * * *